United States Patent [19]
Ploetz et al.

[11] Patent Number: 6,038,470
[45] Date of Patent: Mar. 14, 2000

[54] TRAINING SYSTEM FOR SIMULATING CHANGES IN THE RESISTANCE OF A LIVING BODY

[75] Inventors: Bruce Ploetz, Gilman Hot Springs; Victor A. Wagner, Jr., Mission Viejo, both of Calif.

[73] Assignee: Church of Scientology International, Los Angeles, Calif.

[21] Appl. No.: 09/018,832

[22] Filed: Feb. 4, 1998

Related U.S. Application Data

[63] Continuation of application No. 08/644,851, May 9, 1996, abandoned.

[51] Int. Cl.[7] ........................................ A61B 5/04
[52] U.S. Cl. ................................ 600/547; 434/262
[58] Field of Search .......................... 600/547–548; 434/236, 262; 338/13, 28, 334; 364/482

[56] References Cited

U.S. PATENT DOCUMENTS

| | | | |
|---|---|---|---|
| 3,889,184 | 6/1975 | Bass | 324/62 |
| 4,319,241 | 3/1982 | Mount | 128/903 |
| 4,408,157 | 10/1983 | Beaubien | 324/62 |
| 4,849,903 | 7/1989 | Fletcher et al. | 364/482 |
| 5,045,832 | 9/1991 | Tam | 338/334 |
| 5,297,056 | 3/1994 | Lee et al. | 364/482 |
| 5,526,274 | 6/1996 | Bolan et al. | 364/482 |

OTHER PUBLICATIONS

Hubbard E–Meter Drills Simulator Student User Manual, 1996, Bruce Plotz and Victor Wagner, L.Ron Hubbard Library, Golden Era Productions, Gilman Hot Springs, California (32 pages).

Generator Circuit Source Code, 1996, Bruce Plotz and Victor Wagner, Golden Era Productions, Gilman Hot Springs, California (71 pages).

LED Driver Source Code, 1996, Bruce Plotz and Victor Wagner, Golden Era Productions, Gilman Hot Springs, California (22 pages).

READ Generator PC Jack Interface, 1996, Bruce Plotz and Victor Wagner, Golden Era Productions, Gilman Hot Springs, California (1 page).

Drills Simulator PC Interface Materials List, 1996, Bruce Plotz and Victor Wagner, Golden Era Productions, Gilman Hot Springs, California (2 pages).

*Primary Examiner*—Francis J. Jaworski
*Attorney, Agent, or Firm*—Small Larkin, LLP

[57] ABSTRACT

A system for simulating changes in the resistance of a living body includes an output interface circuit including a variable resistance adapted to smoothly and naturally simulate the resistance of a living body. A generator circuit includes a microprocessor under the control of software to play back digitally recorded data representative of patterns of changing resistance. The software includes a user selection feature permitting various patterns to be played back in a way that simulates changes in the resistance of living body useful for learning about the patterns.

33 Claims, 5 Drawing Sheets

TRAINING SYSTEM FOR SIMULATING CHANGES IN THE RESISTANCE OF A LIVING BODY

This application is a continuation of application Ser. No. 08/644,851 filed on May 9, 1996 and now abandoned which is incorporated herein by reference.

BACKGROUND OF THE INVENTION

1. Field of the Invention

This invention relates to a training apparatus for emulating changes in resistance of a living body.

2. Prior Art

With the advent of Lafayette R. Hubbard's device for measuring and indicating changes in a living body, the possibility of discerning and recognizing small changes in the resistance of living body through an electrometer device has become routinely available. Mr. Hubbard's inventions and various improvements are described and illustrated, for example, in U.S. Pat. No. 3,290,589 and U.S. Pat. No. 4,459,995.

Through the use of such devices, various patterns relating to changes in resistance occurring in the living body were discovered by Mr. Hubbard. Such patterns, also known as "reads", have been categorized and labeled in numerous publications. Operators of such devices are trained through the use of training films and training session to recognize such patterns.

One problem with such training films and training sessions is that the operators typically cannot experience all of the possible patterns which may be generated by a living body. This problem is due in part to the fact that some patterns are difficult to recognize unless experienced during actual use of an electrometer device. This problem is also due in part to the fact that some patterns occur infrequently in a living body. The infrequency of such patterns makes training difficult when humans are used to provide the actual training "reads". To visually recreate some of the patterns, some electrometer devices allow for the play back of previously recorded sessions. During these sessions various patterns may have been observed. While suitable for displaying patterns, the play back mode is not useful for hands-on training because the various controls are inoperative during play back. An electro-mechanical device of this type is disclosed, for example, in U.S. Pat. No. 4,702,259.

The ability to provide recognizable patterns is desirable for training operators. What is needed then is a way to recreate these patterns in a way that is useful for training in a realistic environment. The recreation of these patterns would need to simulate the actual changes in resistance of living body.

SUMMARY OF THE PRESENT INVENTION

It is a general object of the present invention to simulate various patterns of small changes in the resistance of a living body.

It is a specific object of the present invention to simulate specific patterns of small changes in the resistance of a living body.

It is a feature of the present invention to include a variable resistor circuit that simulates the natural changing resistance in a living body.

It is an advantage of the present invention that the simulation of a pattern of changing resistance in a living body appears smooth and natural.

In accordance with the objects, features and advantages of the present invention, a training apparatus comprising, generally, a pattern generator operative to generate a signal representative of changes in resistance from a living body is provided. An output interface circuit receives the signal from the pattern generator and in response generates a variable resistance corresponding to the changes in resistance represented in the signal.

In general, the pattern generator includes a memory having data representative of patterns of changing resistance from a living body stored therein. A central processing unit (CPU) under the control of software is responsive to generate a digital signal representative of the stored pattern data. At least one digital to analog convertor is connected between the CPU and the output interface circuit to transform the digital signal into a form useful to the output interface circuit.

The generator circuit may additionally connect to a user interface including a keypad and a display. The CPU, under the control of a computer program, is responsive to the user interface to thereby permit an operator to control the transmission of patterns through the output interface.

Patterns transmitted through the output interface are converted into a variable resistance. The electrometer is designed and calibrated to connect to a living body. The display of the electrometer provides an indication of the overall resistance in a living body, but more importantly identifies small changes in the resistance of a living body over time. The job of an operator is to monitor these changes in resistance and to identify certain patterns which may result from the changing resistance. The training apparatus of the present invention provides a variable resistance within the range of resistances encountered in a living body and provides smooth and natural changes in resistance in patterns simulating a living body.

BRIEF DESCRIPTION OF THE DRAWINGS

Other objects and advantages of the invention will become apparent from the following detailed description, taken in connection with the accompanying drawings, in which.

DETAILED DESCRIPTION OF THE INVENTION AND PREFERRED EMBODIMENTS

Figure 1:
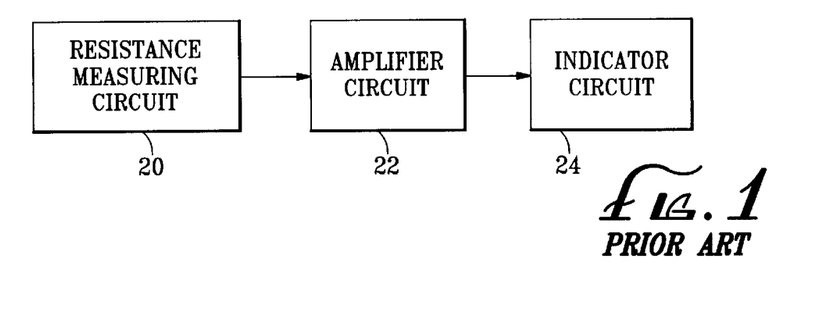
FIG. 1 is a functional block diagram of an electrometer device.

Referring to the figures for purposes of illustration, the training apparatus of the present invention may be used in combination with conventional devices for measuring and indicating changes in the resistance of living body. With reference to FIG. 1, such devices typically use a resistance measuring circuit 20 to transform measured resistances across a living body into the form of a measurement signal. The resistance measuring circuit connects to an amplifier circuit 22 that amplifies the measured signal to an amplified level useful for displaying the signal. An indicator circuit 24 connected to the amplifier circuit 22 displays the measured signal to the operator. Devices of the type suitable for this purpose are disclosed, for example, in U.S. Pat. No. 4,702,259, U.S. Pat. No. 4,459,995 and U.S. Pat. No. 3,290,589, each of which is incorporated herein by reference. A device of the type suitable for this purpose is sold under the brand name "HUBBARD™ PROFESSIONAL MARK SUPER VII" and is manufactured and sold by Hubbard Electrometer Manufacturing of Los Angeles, Calif.

Figure 2:
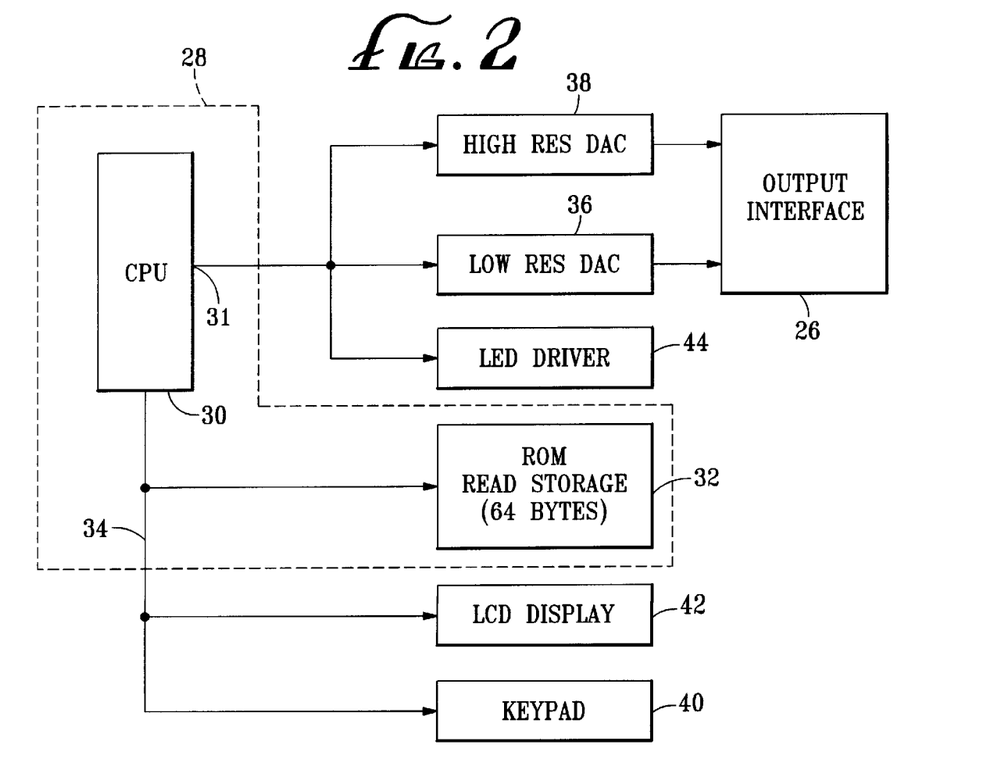
FIG. 2 is a functional block diagram of a training apparatus for measuring the resistance of a living body.

Based upon the above mentioned, known combinations, the training apparatus of the present invention, as illustrated in FIG. 2, advantageously includes a output interface circuit 26 which connects to the electrodes of an electrometer device. The output interface 26 provides, across the electrodes of the electrometer device, a variable resistance which simulates the resistance of a living body. A generator circuit 28 includes a CPU 30 under the control of software. The CPU 30 is preferably an 8-bit microcontroller of the type that includes a serial port 31 for serially transmitting and receiving digital data. A CPU of the type suitable for this purpose is model no. MC68HC705PC8ACP sold by Motorola Inc., Austin, Tex. when configured for "READ-BOX" mode. A memory 32 of the non-volatile memory type is included in the generator circuit and stores data representative of changing resistance patterns. In the preferred embodiment, the memory 32 is an erasable-programmable-read-only memory (EPROM). The patterns of changing resistance are compressed using conventional data compression algorithms and preferably require an EPROM having at least 64K bytes of addressable memory. The patterns comprise data measured at a rate of 300 samples per second and stored in the ROM compressed using a conventional compression method. The CPU reconstructs the original pattern wave from the compressed data. The memory 32 connects to the CPU 30 conventionally through a computer bus 34.

The serial port 31 of the CPU 30 connects to a pair of digital to analog convertors (DACs) 36–38. Each digital to analog convertor generally drives the output interface circuit 26 to provide a resistance across the entire range of resistances measurable in a living body and in small incremental amounts. The change in each increment of resistance should be small enough such that the changing resistance appears smoothly and continuously when viewed using an electrometer device. In the preferred embodiment two DACs 36 and 38 are used wherein the DACs 36 and 38 connect to the output interface in a conventional manner. A first DAC 36 or low resolution DAC is adjustable in relatively large incremental amounts of voltage, i.e., provides low resolution change in resistance. The low resolution DAC 36 provides a signal corresponding to the overall resistance in a living body. If used alone to produce a changing resistance across the electrodes of the electrometer, the low resolution DAC 36 would produce a changing resistance that appears as discrete signal jerks on the electrometer. A second DAC 38 or high resolution DAC is adjustable in relatively small incremental amounts of voltage, i.e., provides a high resolution change in resistance. The high resolution DAC 38 produces small discrete adjustments which provide smooth changes in resistance across the electrodes of the electrometer. If used alone, the high resolution DAC could not cover the full range of overall resistances in a living body. Those skilled in the art will appreciate that two conventional DACs 36 and 38 configured with differing impedances at the output could function as the high and low resolution DACs 36 and 38. A DAC of the type suitable for this purpose is a Maxim, 12 bit serial DAC, model no. MAX539BCPA sold by Maxim Integrated Products Inc. of Sunnyvale, Calif.

A user interface includes a conventional keypad 46 and two conventional display circuits 42 and 44. The keypad 40 and a first display 42 connect conventionally to the CPU 30 of the generator circuit through the computer bus 34. A second display circuit 44 operating conventionally under the control of a conventional display driver CPU (not shown) connects to the CPU 30 through the serial port 31. The source code for the display driver CPU is attached to and incorporated herein by reference. The second display circuit 44 conventionally drives a plurality of three-state light emitting diodes (LEDs) (not shown). The LEDs generally indicate which of the patterns have been selected by the operator using the user interface keypad 40. Any type of conventional display would be suitable for this purpose. The operation of the LEDs in cooperation with the operator's actions are disclosed in the "Hubbard E-Meter Drills Simulator—Student User Manual" which is filed herewith and is incorporated herein by reference.

Figure 3:
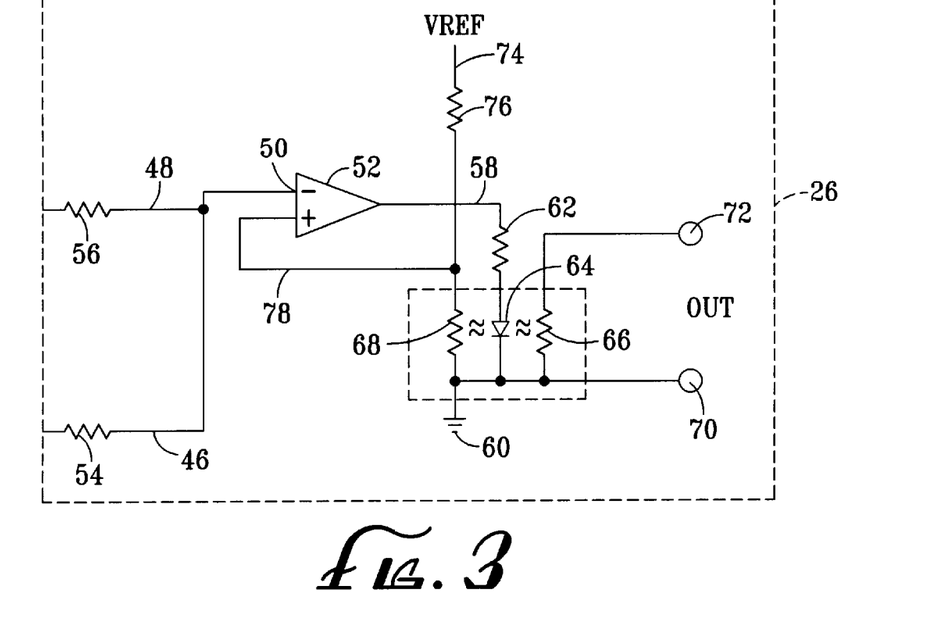
FIG. 3 is a circuit diagram of an output interface of the present invention.

As illustrated in FIG. 3, the preferred embodiment of the output interface circuit 26 includes two parallel leads 46 and 48 connected to the negative input 50 of an operational amplifier 52. Each of the input leads 46 and 48 connects serially to the respective DACs 36 and 38 through respective resistors 54 and 56. These resistors 54 and 56 provide corresponding high resolution and low resolution impedance loading at the output of the high and low resolution DACs to configure the high resolution DAC 38 and the low resolution DAC 36 respectively. The operational amplifier 52 includes an output lead 58 serially connecting to ground 60 through a current limiting resistor 62 and a forward biased light emitting diode 64 (LED). The LED 64 is operatively positioned to transmit light to a pair of variable resistors 66 and 68 that connect in parallel with the LED 64 to ground 60. The variable resistors 66 and 68 are light sensitive and adjust their resistance in proportion to the intensity of light received. Output leads 70 and 72 are attached across a first one of the variable resistors. These output leads 70 and 72 connect conventionally with the electrodes of an electrometer device to thereby provide as input to the electrometer patterns of changing resistances which emulate the patterns of changing resistance from a living body. A high voltage reference 74 connects serially through a fixed resistor 76 and the second variable resistor 68 to ground 60. The positive input lead 78 of the operational amplifier connects across the second variable resistor 68 to ground 60. The voltage reference 74 and fixed resistor 76 combine with the second variable resistor 68 to form a voltage divider circuit. The voltage measured across the second variable resistor 68 provides feedback to the operational amplifier 52 at positive input 78.

The voltage divider circuit illustrated by reference numerals 74, 76 and 68 is configured to provide a measured feedback voltage to the operational amplifier 52 within in a voltage range that is proportional to the range of resistances possible in a living body. The range of resistances anticipated in a living body are generally 900 to 200K ohms. The operational amplifier 52, voltage divider circuit illustrated by reference numerals 74, 76 and 68 and LED 64 combine to adjust the resistance of the first variable resistor 66 to within ±50 ohms of a desired output resistance.

It will be appreciated that the first variable resistor 66 varies only in response to the changing light of the LED. Thus the resistor is electrically isolated from the remainder of the output interface circuit 26. In other words, there is no measurable current or voltage which may be transferred to the first resistor 66 directly from any other part of the circuit. This configuration corresponds to the natural resistance of a living body anticipated by an electrometer device. If a current or voltage were added to the resistance from the output interface circuit 26, the operation of the electrometer would be affected thereby reducing the benefit of the device as a training apparatus.

A pair of light-sensitive variable resistors 66 and 68 and corresponding LED 64 of the type suitable for this purpose is included in a dual photoresistor model Vactec VTL5C4/2 sold by EG&G Opto electronics, St. Louis, Mo. The operational amplifier is conventional and may be constructed using an operational amplifier circuit of the type disclosed in the "READ GENERATOR PC Jack Interface" schematic and "Drills Simulator PC Interface Materials List", each of which is included herewith and is incorporated herein by reference.

Figure 6:
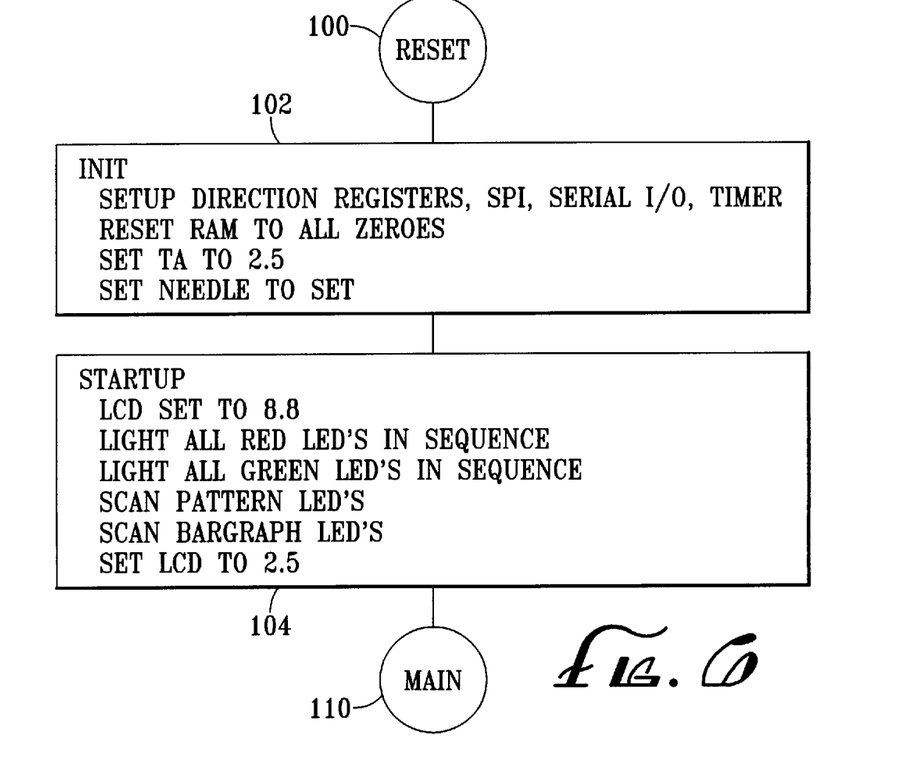
FIG. 6 represents a flow diagram of a reset routine.
Figure 7:
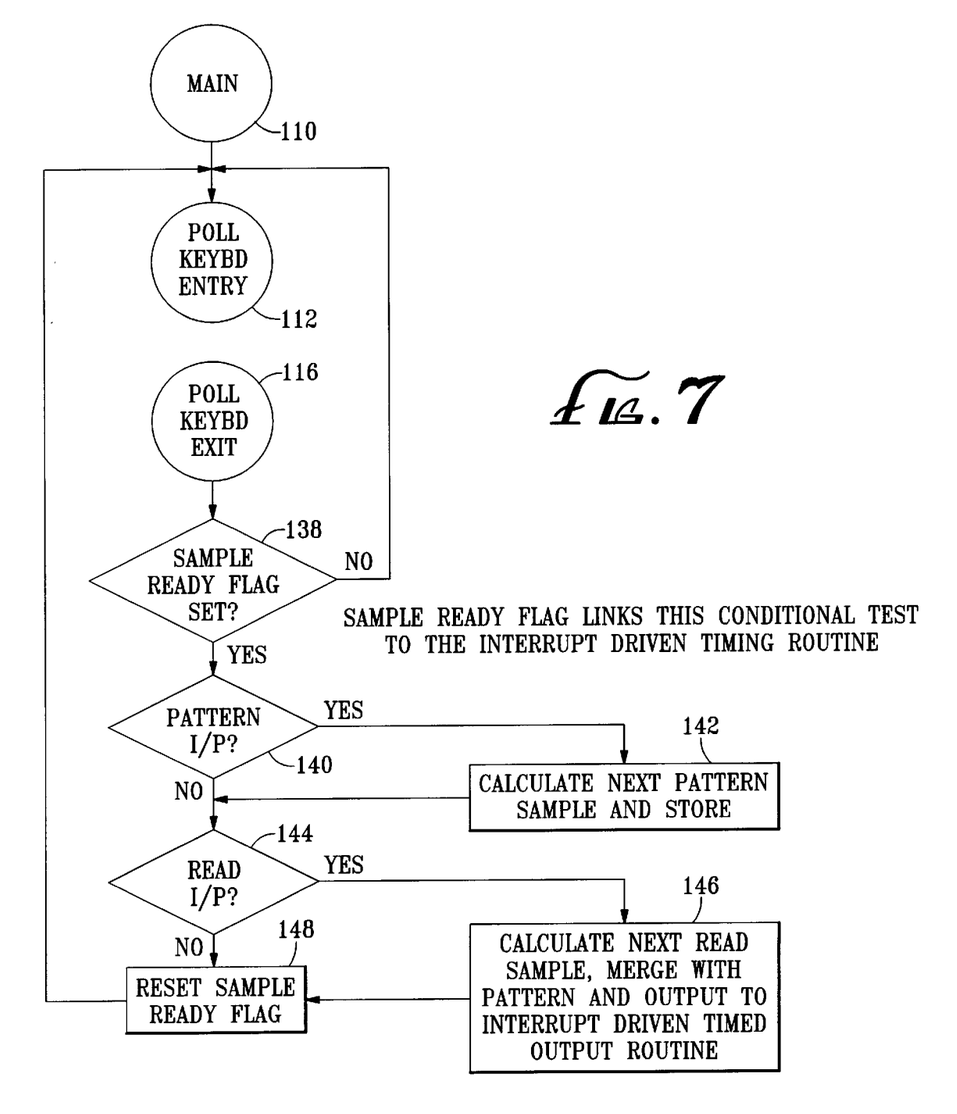
FIG. 7 represents a flow diagram of a main routine.
Figure 8:
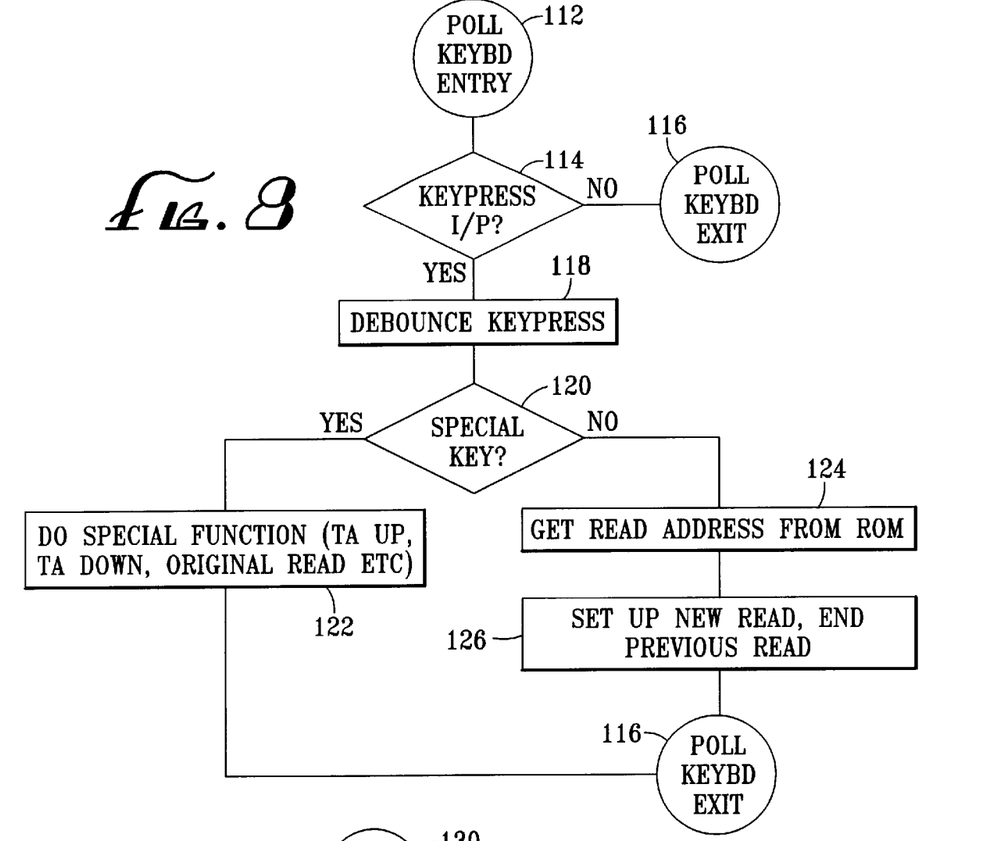
FIG. 8 represents a flow diagram of a poll keyboard entry routine.

In the preferred embodiment, the generator circuit 28 includes software (FIGS. 6–9) responsive to operator inputs from the keypad 40 (FIG. 2) to produce various patterns of changing resistance across the electrometer electrodes. When first powered on or when a reset button is pressed, the program initializes the CPU 30 in a reset routine 100 (FIG. 6). The reset routine 100 includes initialize CPU step 102 and a start-up step 104 that illuminates in a predefined sequence all of the LEDs displayed on the device. Upon completion of the reset routine 100, the program calls a main routine 110. The main routine 110 (FIG. 7) in operation is responsive to the keypad 40 (FIG. 2) and therefore continuously polls the keypad. The operator may chose any of the keys corresponding to a known pattern of changing resistance, special keys may also be depressed. The special keys (not shown) include background patterns, overall resistance adjust up and down keys, memory store labeled "original read" and memory clear keys, a stop resistance change key, a still resistance key, a reset key, a set key, and the "Rise" and "blowdown" keys, the significance and definitions of which are set forth in the materials incorporated by reference herein.

A poll key pad subroutine 112 (FIG. 8) includes a check for keypress in progress conditional step 114. If a key press is not in progress the subroutine returns to the main routine 110 at the poll keyboard exit step 116. Otherwise, if a key press is detected, a keyboard reset step 118 resets the keyboard interrupt. A conditional check for special key step 120 checks if a special key has been pressed. If a special key is pressed, the corresponding special key subroutine 122 is executed. Otherwise, a look-up table is accessed to get the pattern address header from the memory at step 124. If a previous pattern is being executed or a background pattern on-going, the pattern is terminated and the new pattern selected by the keyboard is set up at step 126.

The pattern address header is useful to further save memory space. The pattern data stored in memory may be reused using the pattern address headers to display different size patterns in the electrometer display. These patterns may be manipulated by frequency and/or amplitude factors. In addition background patterns include a starting pattern segment and a repeat pattern segment. The pattern address header includes scaling factors for the amplitude and/or frequency of the pattern, the starting address of the pattern in the memory, the repeat address of the memory in memory and a flag. The flag is for transmission to the second display driver 44 (FIG. 2) and is included to illuminate the LED corresponding to the key pressed. The pattern address headers are unique for each pattern key and operate to scale the stored pattern data to the desired pattern size labeled on the key. In the case of background patterns, the starting address includes a portion of the background pattern that directs the display to begin needle movement from a stopped position. For background pattern headers, the CPU 30 uses the loop point address to return to the point where pattern may be repeated in a manner that displays a smooth and natural changing resistance. Upon completion of a pattern being located and set-up using the header information at step 126, the program returns to the main program at the poll keyboard exit step 116.

Operating independently of the main software program, a timer interrupt routine 130 (FIG. 9) is triggered by hardware interrupts within the CPU at a rate of 300 Hz. The timer interrupt routine 130 includes a send pattern data (to the high and low resolution DACs 36 and 38 (FIG. 2)) and reset timer step 132 (to send the pattern data to drive the output interface 26 (FIGS. 2 and 3)). A set next-sample-ready flag step 134 informs the main program that the data has been sent. The program then returns to the main routine at step 136.

Figure 9:
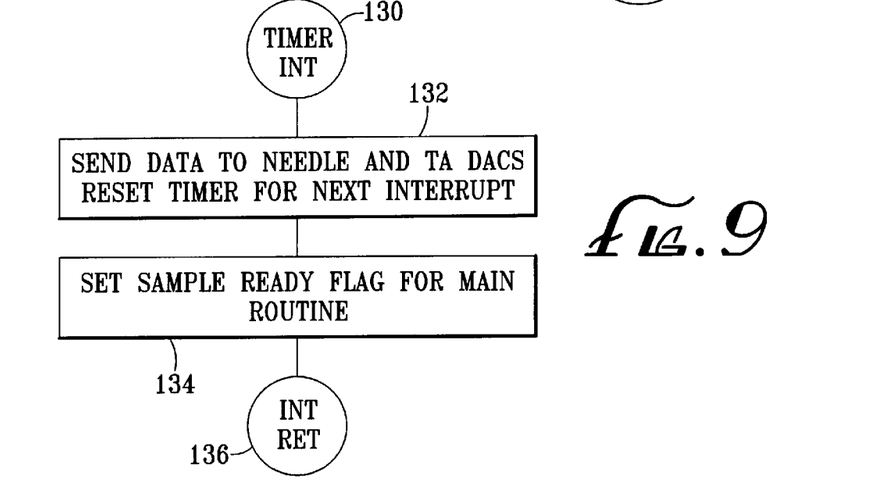
FIG. 9 represents a flow diagram of a timer interrupt routine.

The main program includes a conditional check for a next sample ready flag step 138. If timer interrupt has not been called by the hardware interrupt, the program returns to the poll key board subroutine 112. Otherwise, the main program processes the next set of data samples to be sent to the output interface circuit. A conditional check for background pattern step 140 (FIG. 7) checks for a background pattern. If background pattern is in progress, the next sample of data from the background pattern loop is calculated and stored at step 142. Otherwise, the program checks for an on-going discrete pattern in progress at step 144. If a pattern is on going, the next sample of data is read and merged with the on-going pattern at step 146. A reset next sample ready flag step 148 (FIG. 7) resets sample flag. In this way no additional pattern data will be sampled and calculated prior to the next call of the timer interrupt routine 130 (FIG. 9). The program then returns to the poll keyboard entry routine. A program of the type suitable for this purpose is included with this application and incorporated by reference herein.

The software program merge pattern step 146 (FIG. 7) is particularly useful, because it allows an operator to choose a series or combination of patterns from the keypad 40 (FIG. 2). The merge pattern function includes an "adjust needle" subroutine in the software which upon completion of a pattern transmission to the output interface circuit 26 returns the needle in a smooth and natural manner to a neutral point from which another pattern may be generated. The "adjust needle" subroutine provides an automatic transition between patterns that appears as though the series patterns in combination were naturally generated by a living body. This feature is particularly desirable in training applications where various real life combinations may be attempted as desired by the operator providing a user selection feature.

In the absence of a user selection feature it will be appreciated that the output interface 26 may operate in cooperation with any conventional generator circuit for example those skilled in the art will appreciate that any analog or digital player, for example a cassette tape player (not shown) having patterns of changing resistance stored on a storage medium could be adjusted to provide corresponding high and low resolution signals to drive the output interface circuit 26 (FIGS. 2 and 3). While any pattern may be stored in the EPROM 32, the preferred patterns for training were discovered by L. Ron Hubbard and are published in the books "Book of E-Meter Drills", "Understanding The E-Meter", "E-Meter Essentials" and the motion picture "M-9: E-Meter Reads". Each of these works have been adapted from the works of L. Ron Hubbard, all of which are incorporated herein by reference.

Figure 4:
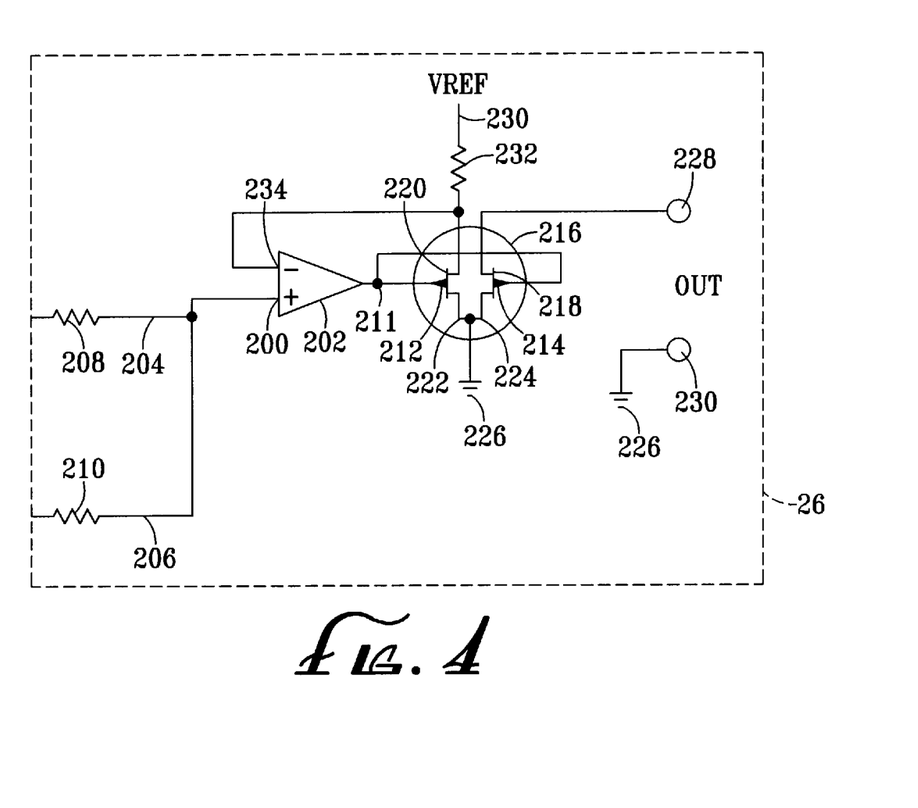
FIG. 4 is a circuit diagram of an alternative output interface of the present invention.

An alternative embodiment of the output interface circuit 26 is shown in FIG. 4. The negative input lead 200 of an operational amplifier 202 connects to parallel input leads 204 and 206, that serially connect to the high and low resolution DACs 38 and 36 (FIG. 2) through corresponding impedance resistors 208–210 (FIG. 4). The output leads 211 of the operation amplifier 202, 212 and 214 connects to the gates 212 and 214 of a dual field effect transistor 208 (FET) 216. The transistors 218 and 220 of the dual FET 216 have collectors 222 and 224 connected to ground 226 output leads 228 and 230 connect across the emitter of the first transistor 218 and ground 226. The emitter of second transistor 220 is connected to a voltage reference 230 in series with a fixed resistor 232. The positive input lead 234 of the operational amplifier 202 connects across the emitter of the second transistor 218 to provide feedback in a similar manner to the circuit illustrated in FIG. 3. This circuit, while suitable for providing an output to the electrometer, does not have the range of the preferred output interface. Furthermore, the transistors 218 and 220 generate unwanted non-linearity when the voltage level exceeds one volt. Additionally, some current drain occurs through the gate of the first transistor 218, which affects the resistance measurements made by an electrometer of the output interface circuit 26.

Figure 5:
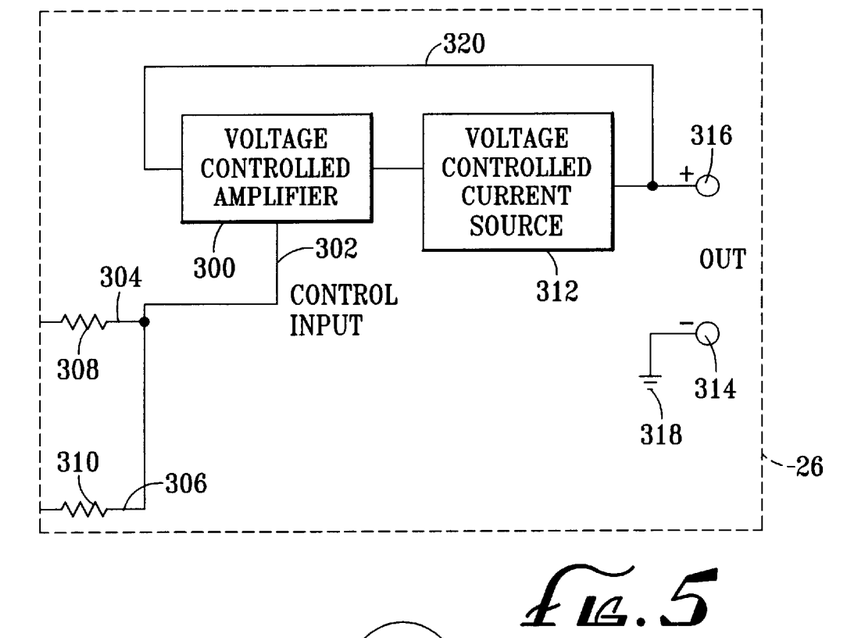
FIG. 5 is a functional block diagram of a second alternative output interface of the present invention.

In a second alternative embodiment of the output interface circuit 26, shown in FIG. 5, a conventional voltage controlled amplifier 300 includes a control input lead 302 connected to parallel input leads 304 and 306 that connect to the high and low resolution DACs 38 and 36 (FIG. 2) through corresponding impedance resistors 308 and 310. The output of the amplifier 300 connects to a voltage controlled current source 312. Output leads 314 and 316 connect between the output of the voltage controlled current source 312, and ground 318. A feed back lead 320 extends from the output of the voltage controlled current source 312 to another input of the amplifier 300 in a conventional manner. A voltage controlled amplifier of the type suitable for this purpose is model no. AD532 sold by Analog Devices, Inc. of Norwood, Mass. A voltage controlled current source 312 of the type suitable for this purpose is model no. OP90 sold by Analog Devices, Inc. of Norwood, Mass. This embodiment while suitable for providing an output resistance to the electrometer, is unstable at high output resistance values. In addition, the polarity of the electrometer meter must be determined prior to use and must be matched with the output interface circuit by incorporating a conventional switch. Additional current drain from the voltage controlled current source can affect the accuracy of electrometer resistance measurements, thereby diminishing its value during training.

While the present invention has been described in connection with what are presently considered to be the most practical, and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A training system for simulating changes in the resistance of a living body comprising:

an electrometer having input electrodes;

an output interface circuit connected to said input electrodes;

a variable resistance included within the output interface circuit and operative to accurately simulate changes in the resistance in a living body; and a generator circuit connected to said output interface circuit.

2. The system of claim 1 wherein the generator circuit further includes:

a memory; and data stored in the memory, said data being representative of predetermined patterns of changing resistance in a living body.

3. The system of claim 1 wherein the generator circuit further includes:

a central processing unit; and computer implemented software adapted to control the central processing unit and to generate digital signals representative of patterns of changing resistence from a living body.

4. The system of claim 3 wherein the generator circuit further includes at least one digital to analog converter operatively connected between the central processing unit and the output interface circuit.

5. The system of claim 3 further including a user interface operatively connected to the generator circuit and adapted to permit control of transmission of said patterns.

6. The system of claim 3 wherein said generator circuit further includes:

a first, relatively low resolution digital to analog converter; and a second, relatively high resolution digital to analog converter.

7. The system of claim 3 wherein said output interface further includes:

an operational amplifier;

a first output lead from the first digital to analog converter and a second output lead from the second digital to analog converter, said first and said second output lead operatively connected as input to the operational amplifier;

at least one output lead from said operational amplifier; and, said variable resistance electronically isolated from the remainder of said output interface circuit, and adapted to connect as an input to an electrometer device, whereby patterns of changing resistance that emulate patterns of changing resistance from a human body are emulated.

8. The system of claim 7 wherein:

said variable resistance includes at least one light sensitive, variable resistor adapted to vary its resistance in proportion to intensity of light received; and, said generator circuit includes a light emitting diode connected to the output lead from said operational amplifier and adapted to transmit light to said light sensitive, variable resistor and to provide said electronic isolation.

9. The system of claim 1 wherein the generator circuit further includes:
a keypad;
a central processing unit; and
software responsive to operator inputs from the keypad and operative to control said central processing unit to produce predetermined patterns of changing resistance across said electrometer electrodes.

10. The system of claim 9 wherein the software further includes a merge patten subroutine adapted to permit a series or combination of said predetermined patterns to be produced from said keypad.

11. The system of claim 9 wherein the software further includes an adjust needle subroutine adapted to permit transition between said predetermined patterns as if the transition was naturally generated by a living body.

12. A training apparatus for simulating changes in the resistance of a living body comprising:
an output interface circuit;
a generator circuit connected to said output interface circuit and including:
a central processing unit adapted to drive said output interface circuit to simulate a pattern of changing resistance;
software adapted to control the central processing unit and to generate digital signals representative of patterns of changing resistence from a living body; and
a memory adapted to store data representative of said patterns of changing resistance.

13. The training apparatus of claim 12 wherein said output interface circuit further includes:
an operational amplifier;
a first output lead from the first digital to analog converter and a second output lead from the second digital to analog converter, said first and said second output lead operatively connected as input to the operational amplifier;
at least one output lead from said operational amplifier; and,
said variable resistance electronically being isolated from the remainder of said output interface circuit, and adapted to connect as an input to an electrometer device.

14. The training apparatus of claim 13 wherein:
said variable resistance includes at least one light sensitive, variable resistor adapted to vary its resistance in proportion to intensity of light received; and,
said generator circuit includes a light emitting diode connected to the output lead from said operational amplifier and adapted to transmit light to said light sensitive, variable resistor and to provide said electronic isolation.

15. The apparatus of claim 12 wherein the generator circuit further includes at least one digital to analog converter operatively connected between the central processing unit and the output interface circuit.

16. The apparatus of claim 12 further including a user interface operatively connected to the generator circuit and adapted to permit control of transmission of said patterns.

17. The apparatus of claim 12 wherein said generator circuit further includes:
a first, relatively low resolution digital to analog converter; and
a second, relatively high resolution digital to analog converter.

18. The apparatus of claim 12 wherein said output interface further includes:
an operational amplifier;
a first output lead from the first digital to analog converter and a second output lead from the second digital to analog converter, said first and said second output lead operatively connected as input to the operational amplifier;
at least one output lead from said operational amplifier; and,
said variable resistance electronically isolated from the remainder of said output interface circuit, and adapted to connect as an input to an electrometer device, whereby patterns of changing resistance that emulate patterns of changing resistance from a human body are emulated.

19. The apparatus of claim 18 wherein:
said variable resistance includes at least one light sensitive, variable resistor adapted to vary its resistance in proportion to intensity of light received; and,
said generator circuit includes a light emitting diode connected to the output lead from said operational amplifier and adapted to transmit light to said light sensitive, variable resistor and to provide said electronic isolation.

20. The system of claim 12 wherein the generator circuit further includes:
a keypad;
a central processing unit; and
software responsive to operator inputs from the keypad and operative to control said central processing unit to produce predetermined patterns of changing resistance across said electrometer electrodes.

21. The system of claim 20 wherein the software further includes a merge patten subroutine adapted to permit a series or combination of said predetermined patterns to be produced from said keypad.

22. The system of claim 20 wherein the software further includes an adjust needle subroutine adapted to permit transition between said predetermined patters as if the transition was naturally generated by a living body.

23. A method for simulating changes in the resistance of a living body comprising: simulating predetermined patterns of changing resistance in a living body to create data representative of said patterns,
collecting said data representative of said patterns of changing resistance in a living body;
storing, in a digital form, said data representative of said patterns of changing resistance; and providing said data as input to an electrometer to thereby emulate the patterns of changing resistance from a living body corresponding to said predetermined patterns and to provide training in use of the electrometer.

24. The method of claim 23 further including:
selecting data representative of predetermined ones of said patterns of changing resistance.

25. The method of claim 23 further including:
generating digital signals representative of said data representative of said patterns of changing resistance.

26. The method of claim 23 further including:
generating digital signals representative of said data representative of predetermined ones of said patterns of changing resistance.

27. The method of claim 26 further including:

converting said digital signals into analog signals representative of said patterns of changing resistance.

28. The method of claim 27 further including:

converting said analog signals into a human readable format; and displaying said format.

29. The method of claim 23 further including:

merging a plurality of said predetermined ones of said patterns.

30. The method of claim 29 further including:

transitioning between any two of said plurality of said predetermined ones of said patterns.

31. The method of claim 25 further including:

compressing said digital signals prior to storing said signals on said storage medium.

32. The method of claim 23 wherein scanning is performed by a contact image sensor.

33. The method of claim 23 wherein scanning is performed by a charge coupled device.

* * * * *